United States Patent
Arashi

(10) Patent No.: US 9,618,024 B2
(45) Date of Patent: Apr. 11, 2017

(54) CLIP ATTACHING STRUCTURE OF VEHICLE SEAT

(71) Applicant: TOYOTA BOSHOKU KABUSHIKI KAISHA, Aichi-ken (JP)

(72) Inventor: Masato Arashi, Nagoya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 40 days.

(21) Appl. No.: 14/694,318

(22) Filed: Apr. 23, 2015

(65) Prior Publication Data

US 2015/0308477 A1 Oct. 29, 2015

(30) Foreign Application Priority Data

Apr. 25, 2014 (JP) .................................. 2014-091065

(51) Int. Cl.

| | |
|---|---|
| *F16M 13/02* | (2006.01) |
| *B60N 2/70* | (2006.01) |
| *B60N 2/72* | (2006.01) |
| *F16B 9/02* | (2006.01) |
| *B60N 2/44* | (2006.01) |

(52) U.S. Cl.
CPC ................ *F16B 9/023* (2013.01); *B60N 2/44* (2013.01); *B60N 2/7041* (2013.01); *B60N 2/72* (2013.01); *F16M 13/02* (2013.01)

(58) Field of Classification Search
CPC ................................ F16B 9/023; B60N 2/7041
See application file for complete search history.

(56) References Cited

U.S. PATENT DOCUMENTS 1,802,964 A * 4/1931 Brady ..................... F16L 3/221
248/68.1
3,157,377 A * 11/1964 Orenick .................. F16L 3/127
174/164

(Continued)

FOREIGN PATENT DOCUMENTS

| CN | 101438065 | 5/2009 |
|---|---|---|
| CN | 102762876 | 10/2012 |
| JP | 2010-180931 | 8/2010 |

OTHER PUBLICATIONS

Official Action, along with English-language translation thereof, in CN Appl. No. 201510202404.3 dated Oct. 21, 2016.

*Primary Examiner* — Timothy J Brindley

(74) *Attorney, Agent, or Firm* — Greenblum & Bernstein, P.L.C.

(57) ABSTRACT

There is disclosed a clip attaching structure of a vehicle seat. The seat frame includes an attaching hole and an expanded hole which expands a hole thereof from the attaching hole in a radial direction. The clip includes a fitting portion inserted into the attaching hole to fit in an inner periphery of the attaching hole, and an extending portion which extends a shape thereof from the fitting portion in the radial direction to be inserted into the expanded hole. A tip of the extending portion extends beyond the fitting portion in an inserting direction. On a tip surface of the extending portion in the inserting direction, a guide surface is formed to abut on a peripheral edge portion of the expanded hole when an inserting position of the fitting portion shifts from the attaching hole in the radial direction, thereby guiding the fitting portion toward the attaching hole.

4 Claims, 12 Drawing Sheets

(56) References Cited

U.S. PATENT DOCUMENTS

| | | | | |
|---|---|---|---|---|
| 3,210,032 A * | 10/1965 | Van Slyke | F16L 3/23 174/164 |
| 3,246,375 A * | 4/1966 | Landwer | F16B 5/125 24/297 |
| 3,345,706 A * | 10/1967 | Stokes | F16B 5/0685 24/458 |
| 4,131,258 A * | 12/1978 | Okuda | F16B 21/02 24/339 |
| 4,312,487 A * | 1/1982 | Kimura | F16L 3/1236 206/338 |
| 4,386,752 A * | 6/1983 | Pavlak | F16L 3/127 24/543 |
| 4,422,222 A * | 12/1983 | Notoya | F16B 5/0642 24/289 |
| 4,728,068 A * | 3/1988 | Rivkin | F16B 21/088 24/297 |
| 5,762,397 A * | 6/1998 | Venuto | B60N 2/667 297/284.4 |
| 5,845,883 A * | 12/1998 | Meyer | F16B 19/004 248/222.12 |
| D420,569 S * | 2/2000 | Evans | D8/382 |
| 6,209,827 B1 * | 4/2001 | Kawai | F16B 21/02 248/49 |
| 6,612,525 B2 * | 9/2003 | Bagdi | F16B 21/02 248/71 |
| 6,747,209 B2 * | 6/2004 | Uchida | B60R 16/0215 174/135 |
| 6,923,407 B2 * | 8/2005 | Takeuchi | F16B 21/02 24/458 |
| 7,562,420 B2 * | 7/2009 | Kato | F16B 5/0664 24/297 |
| 8,403,272 B2 * | 3/2013 | Ohno | F16L 3/127 174/164 |
| 9,194,414 B2 * | 11/2015 | Bishop | F16B 5/0642 |
| 9,254,908 B2 * | 2/2016 | Healy | B64C 1/406 |

* cited by examiner

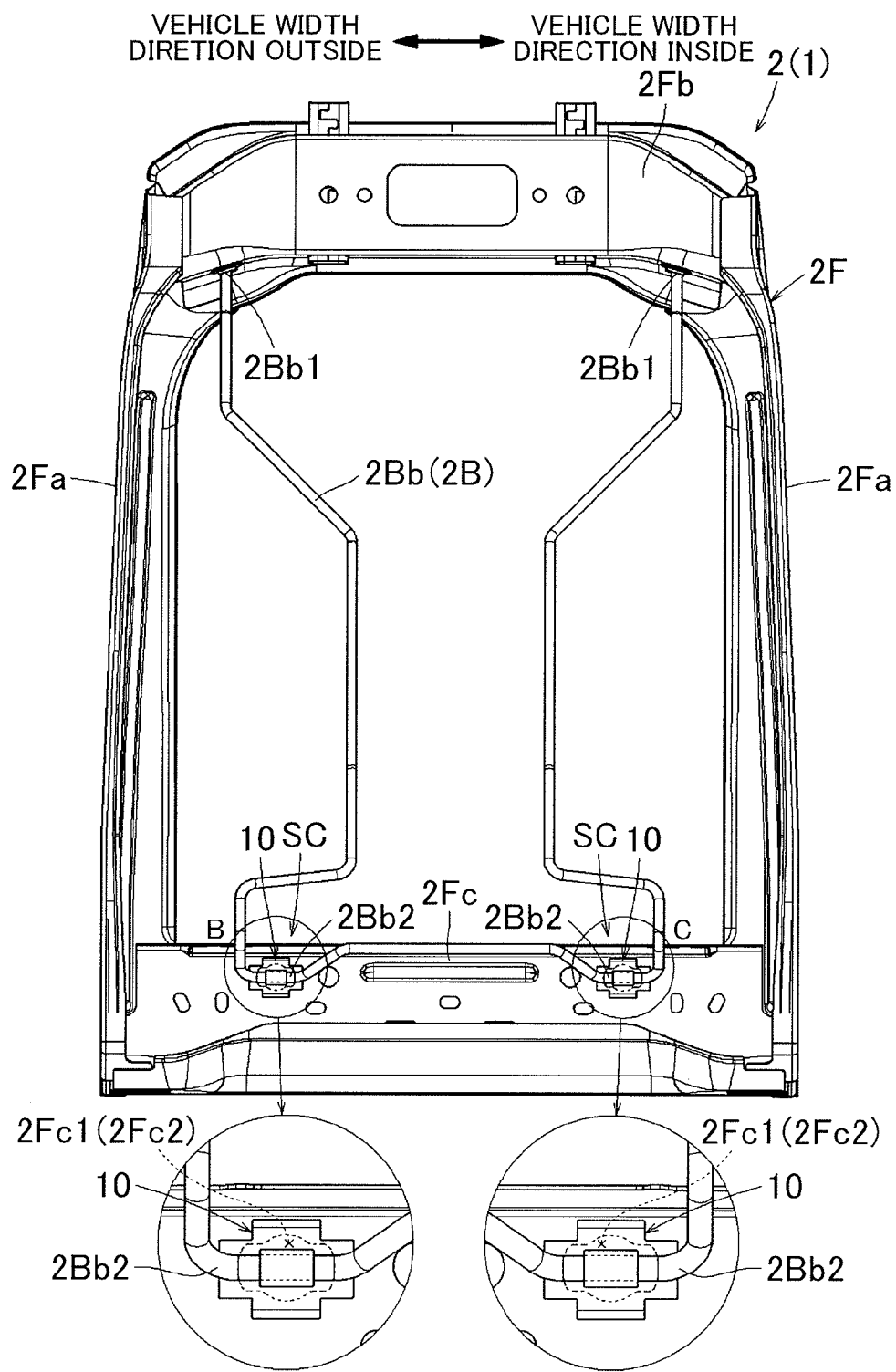

FIG. 4A
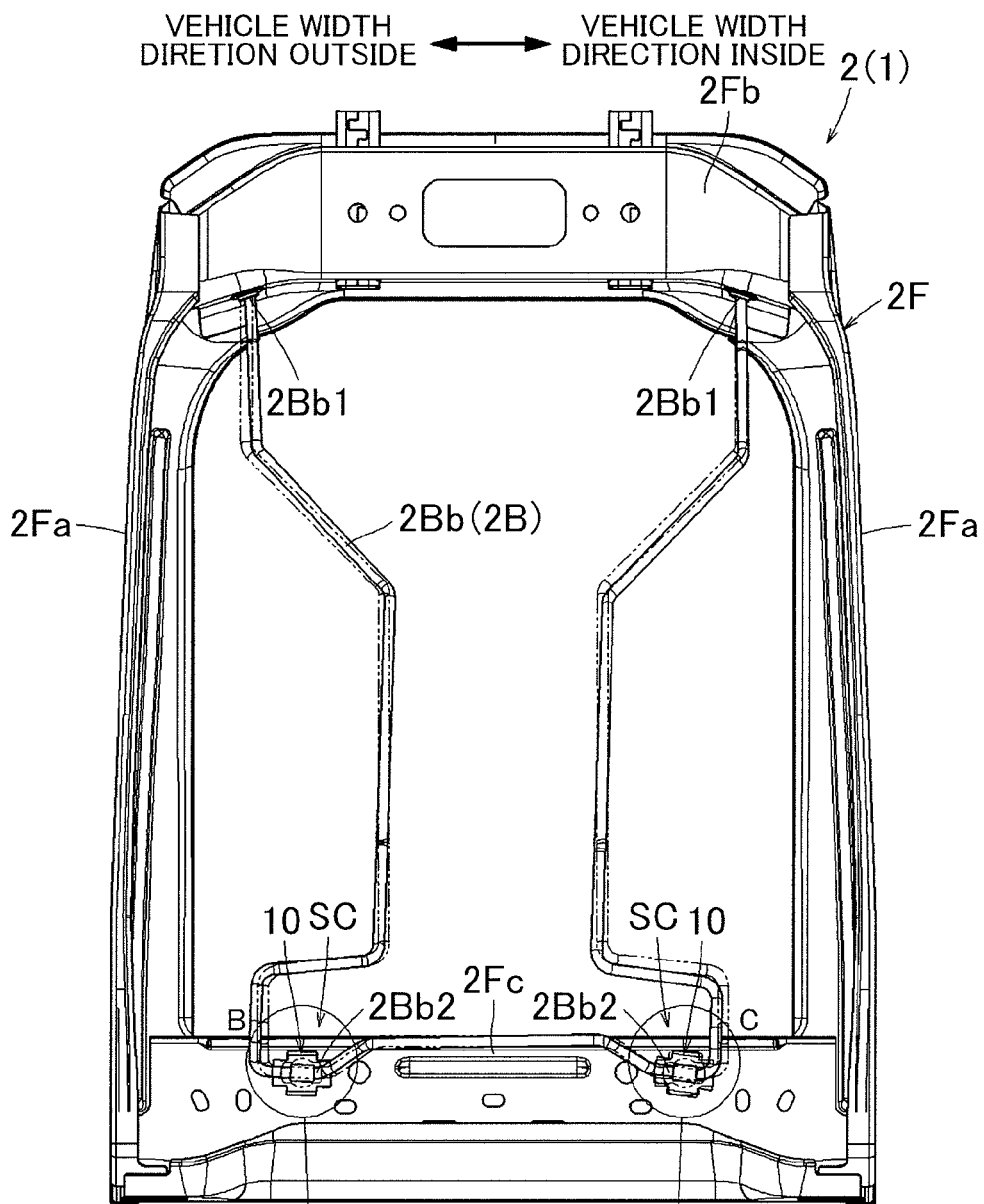
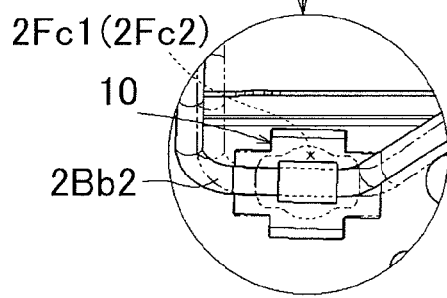
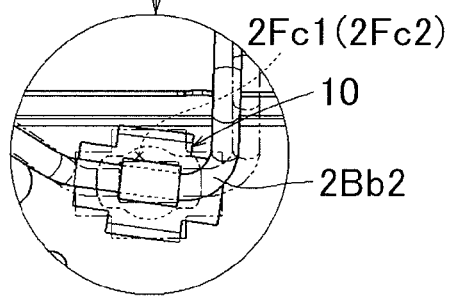
FIG. 4B    FIG. 4C

FIG. 7
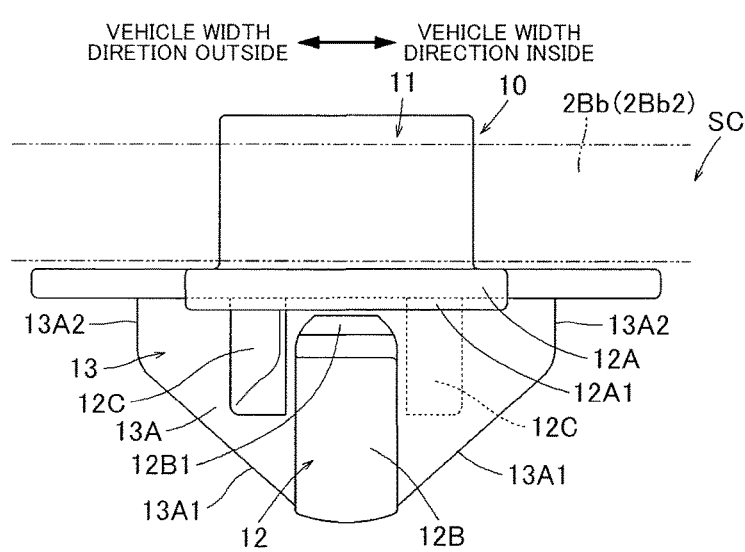
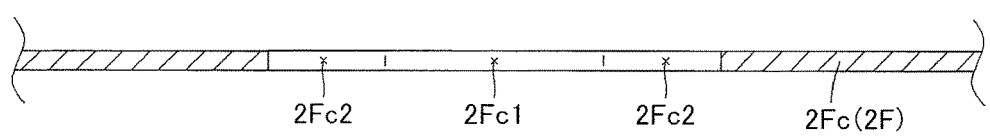

F I G . 8
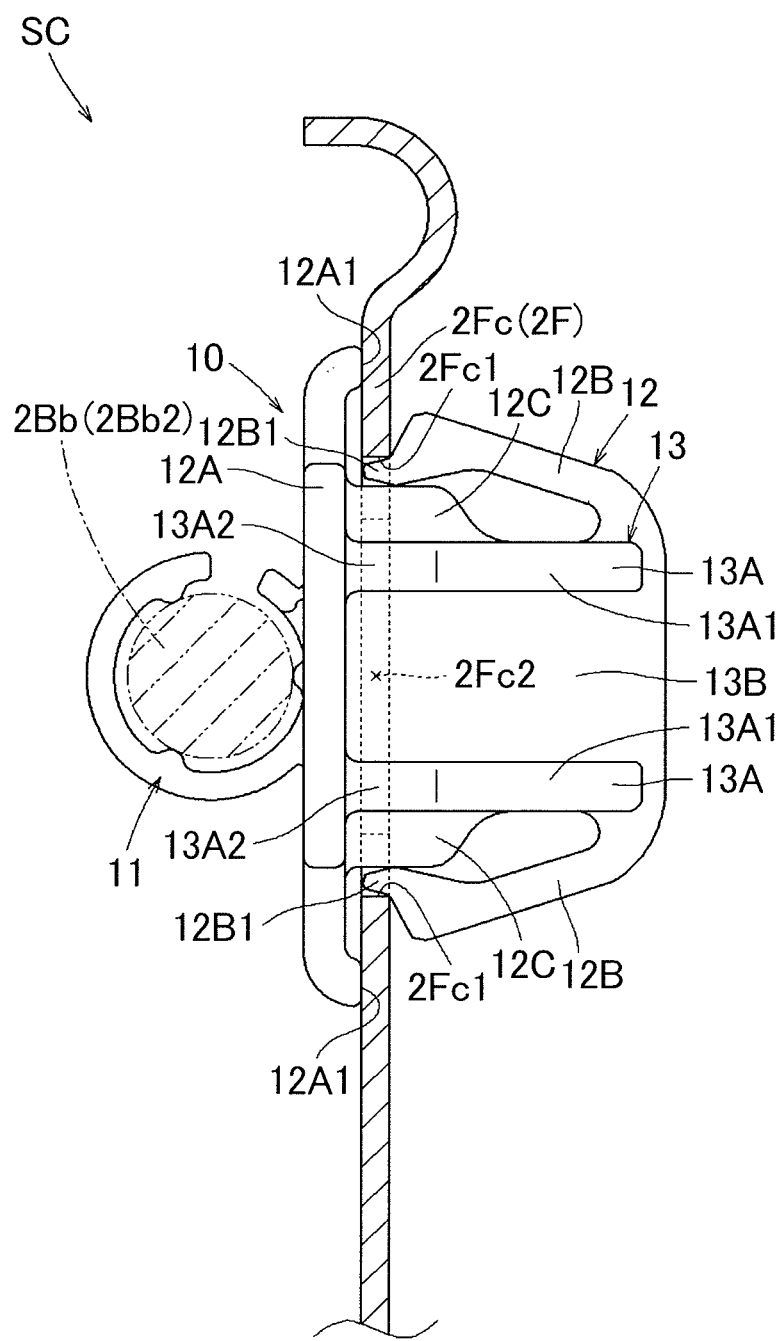

CLIP ATTACHING STRUCTURE OF VEHICLE SEAT

INCORPORATION BY REFERENCE

The disclosure of Japanese Patent Application No. 2014-091065 filed on Apr. 25, 2014 including the specification, drawings and abstract is incorporated herein by reference in its entirety.

BACKGROUND OF THE INVENTION

1. Field of the Invention

The invention relates to a clip attaching structure of a vehicle seat. More particularly, it relates to a clip attaching structure of a vehicle seat in which each clip as an attachment of equipment is attached to a seat frame.

2. Description of Related Art

Heretofore, it has been known that in an automobile seat, a cushion spring wire is attached to a seat frame by use of clips made of a resin (U.S. Pat. No. 5,762,397). Each clip has a bonding portion which holds a wire and an attaching portion which is inserted into an attaching hole formed in the seat frame and attached to the set frame. When the attaching portion of the clip is inserted into the attaching hole, an engaging pawl formed on the attaching portion is elastically hooked on an inner peripheral portion of the attaching hole, so that the clip is attached in a state where the clip is prevented from coming off from the attaching hole while the clip is inhibited from rattling to the attaching hole in a radial direction.

SUMMARY OF THE INVENTION

However, in the above technology, when an inserting position of each clip shifts from an attaching hole during attaching of the clip, the clip cannot be inserted into the attaching hole. An object of the invention is to provide a clip attaching structure of a vehicle seat in which each clip can suitably be inserted into an attaching hole, even when an inserting position of the clip shifts from the attaching hole during attaching of the clip.

According to a first aspect of the invention, there is provided a clip attaching structure of a vehicle seat in which a clip as an attachment of equipment is attached to a seat frame. The seat frame includes an attaching hole extending through the seat frame. The clip includes a fitting portion which is inserted into the attaching hole to fit in an inner peripheral portion of the attaching hole. Furthermore, the seat frame includes an expanded hole which expands a hole shape thereof from the attaching hole in a radial direction. Additionally, the clip includes an extending portion which extends a shape thereof from the fitting portion in the radial direction to be inserted into the expanded hole. The extending portion extends beyond the fitting portion in an inserting direction to be also inserted into the attaching hole, and on a tip surface of the extending portion in the inserting direction, a guide surface is formed to abut on a peripheral edge portion of the expanded hole when an inserting position of the fitting portion shifts from the attaching hole in the radial direction, thereby guiding the fitting portion toward the attaching hole so that the fitting portion is centered.

According to this aspect, even when the fitting portion of the clip is inserted from a position which shifts from the attaching hole in the radial direction, the shift of the inserting position of the clip can be corrected by the guide surface of the extending portion.

In the abovementioned aspect, the fitting portion may have a constitution where there are equally disposed, in a circumferential direction, fitting regions which are inserted into the attaching hole to fit in the inner peripheral portions of the attaching hole, and elastic engaging regions which are inserted into the attaching hole prior to the fitting regions to be elastically pushed and narrowed and then restored to be hooked on the peripheral edge portions of the attaching hole from a backside, thereby exerting a come-off preventive force and a radial repulsive force.

According to this constitution, the fitting portion of the clip is inserted into the attaching hole and centered therein by bending the elastic engaging regions equally disposed in the circumferential direction. Furthermore, at the centered position, the fitting regions of the fitting portion which are similarly equally disposed in the circumferential direction are fitted into the inner peripheral portion of the attaching hole, and hence the fitting portion can be fitted so that the fitting portion does not rattle to the attaching hole. In this manner, the fitting portion can elastically be inserted into the attaching hole while being centered, and finally the fitting portion can be fitted into the attaching hole so that a radial movement of the fitting portion in the attaching hole is restricted.

In the abovementioned aspect, the extending portion may be formed to extend outwardly on both outer sides of the fitting portion, and the fitting portion may exert a fitting force in the attaching hole on both sides in the radial direction perpendicular to an extending direction of the extending portion.

According to this constitution, the extending portion can correct the shift of the inserting position of the fitting portion over a broad range. In addition, when the fitting portion is inserted into the attaching hole, the extending portion and the fitting portion can be inserted into the attaching hole in a state where the fitting portion is guided so that a position of the fitting portion does not shift in any direction in a plane of the attaching hole.

In the abovementioned aspect, the attaching hole may be formed into a round shape, and the fitting portion of the clip may be attached in a state where a positional shift is reduced in a rotating direction to the attaching hole.

According to this constitution, a shift of an attaching position of equipment can be reduced by regulating movement in which tilting by rotation is less performed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3A is a front view of the frame structure of the seat back;

FIG. 3B is an enlarged view of a part of FIG. 3A;

FIG. 3C is an enlarged view of another part of FIG. 3A;

FIG. 4A is a front view showing an attached state when a variation occurs in a back spring;

FIG. 4B is an enlarged view of a part of FIG. 4A;

FIG. 4C is an enlarged view of another part of FIG. 4A;

FIG. 7 is a sectional view taken along the VII-VII line of FIG. 5 (including an arrow view of the clip);

FIG. 8 is a sectional view showing that the clip of FIG. 6 is attached to an attaching hole (including an arrow view of the clip);

DETAILED DESCRIPTION OF EMBODIMENTS

Hereinafter, an embodiment of the present invention will be described with reference to the drawings.

First, a clip attaching structure SC of a vehicle seat of an example embodiment (hereinafter referred to as "the clip attaching structure SC") will be described with reference to FIG. 1 to FIG. 12. As shown in FIG. 1A to FIG. 3B, the clip attaching structure SC of the present embodiment is applied to a seat back 2 of a seat 1 as a driver's seat of a right-hand steering car. Specifically, the clip attaching structure SC is an attaching structure in which a clip 10 as an attachment of a back spring 2B disposed in the seat back 2 is attached to a frame (a back frame 2F) of the seat back 2.

Figure 1:
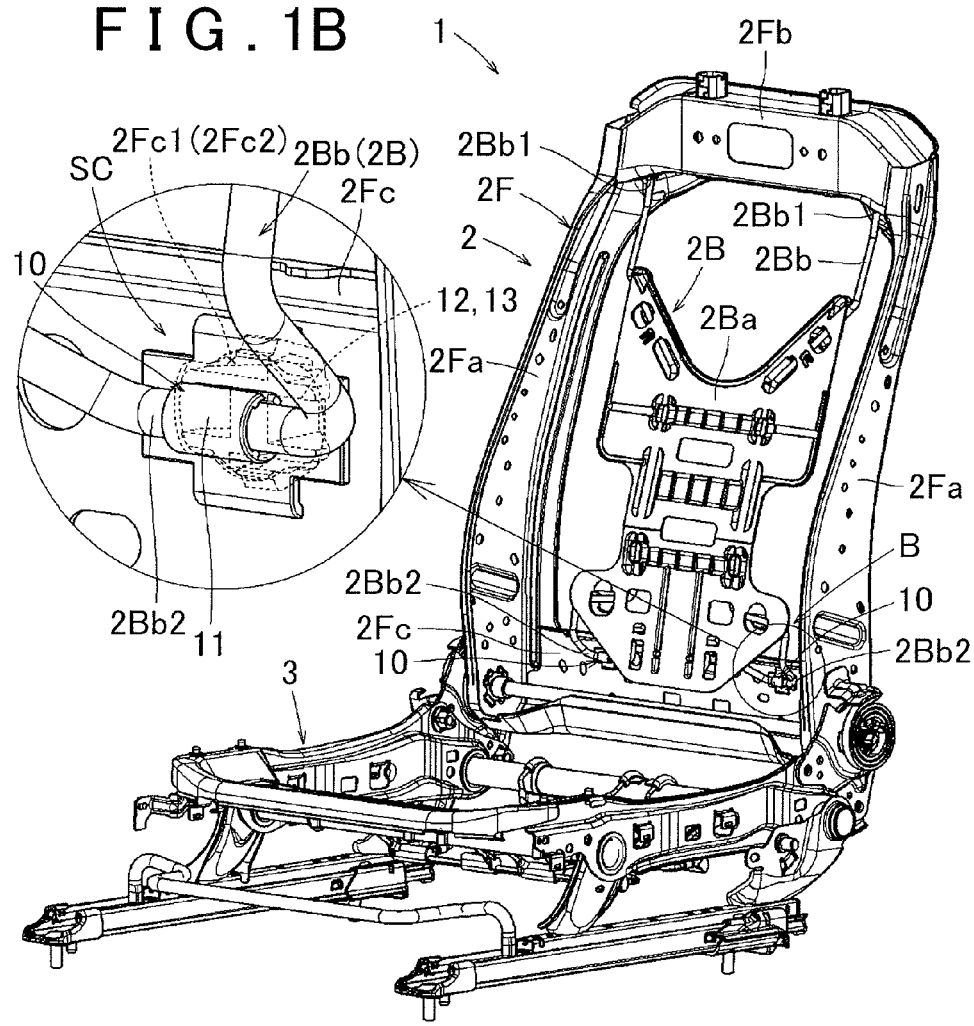
FIG. 1A is a perspective view showing a schematic constitution of a clip attaching structure of a vehicle seat of Embodiment 1.
FIG. 1B is an enlarged view of a part of FIG. 1A.
Figure 2:
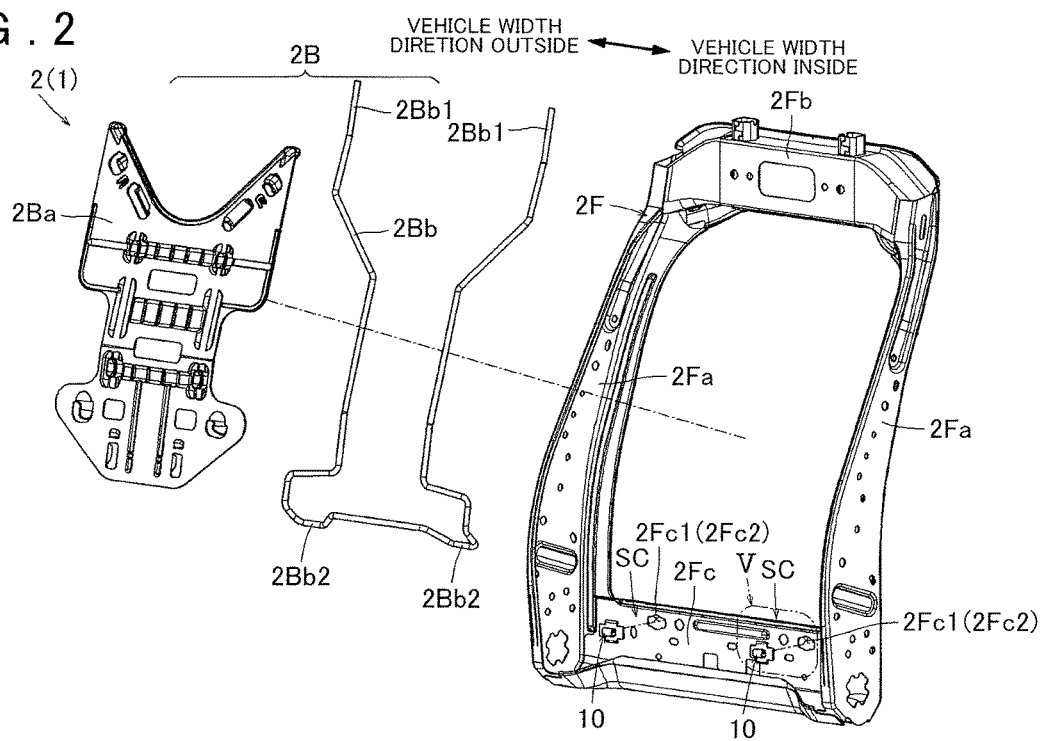
FIG. 2 is an exploded perspective view of a frame structure of a seat back.

Here, the seat 1 is constituted of the seat back 2 and a seat cushion 3 as shown in FIGS. 1A and 1B. In the seat back 2, as shown in FIG. 2 to FIG. 3B, the back frame 2F constituting a framework of the seat back is entirely shaped in the form of a substantially quadrangular frame by assembling a pair of right and left side frames 2Fa, an upper frame 2Fb integrally disposed over a space between upper end portions of the respective side frames 2Fa, and a lower plate 2Fc integrally disposed over a space between lower end portions of the respective side frames 2Fa.

Each of the side frames 2Fa is formed by using a steel plate material cut longitudinally in a height direction, and the side frames are disposed to face each other on an inner side of the seat. In the respective side frames 2Fa, front edge portions and rear edge portions are bent on the inner side of the seat, and hence the edges are rounded so that the edges are hard to project outwardly, and a structural strength of each side frame against bend or torsion improves.

The upper frame 2Fb is formed by bending a steel plate material so that a cross section thereof has an inverted U-shape, and the upper frame is disposed over the space between the upper end portions of both the side frames 2Fa and firmly and integrally bonded to these side frames by welding. Specifically, front and rear edge surfaces of the upper frame 2Fb on both right and left sides are attached and welded to front and rear edge surfaces of the side frames 2Fa which are bent to the inner side of the seat, respectively. That is, the upper frame 2Fb is covered with the respective side frames 2Fa from an outside of the upper frame so that edges of the upper frame are hard to be exposed outwardly.

The lower plate 2Fc is formed by bending a steel plate material so that a cross section of the lower plate has a J-shape, and the lower plate is disposed over the space between the lower end portions of both the side frames 2Fa and firmly and integrally bonded to these side frames by the welding. Specifically, respective right and left edge surfaces of the lower plate 2Fc are attached and welded to respective rear edge surfaces of the side frames 2Fa which are bent to the inner side of the seat. That is, the lower plate 2Fc is covered with the respective side frames 2Fa from an outside of the lower plate so that edges of the lower plate are hard to be exposed outwardly.

The J-shaped cross section of the lower plate 2Fc is curved along a shape of a rounded lower peripheral edge portion of each of the side frames 2Fa, and the lower plate is set along the peripheral edge portion of each side frame and attached to the side frame. In consequence, the lower plate 2Fc is disposed to protect, from a downside, each unshown recliner coupling rod disposed across the space between the lower end portions of the side frames 2Fa.

Additionally, in the abovementioned quadrangular frame of the back frame 2F, the back spring 2B is attached to elastically and softly receive a back rest load of a seated passenger who sits on the seat back 2. As shown in FIG. 2 to FIG. 3B, the back spring 2B is constituted of a pressure receiving plate 2Ba as a plate member made of a resin, and a spring wire 2Bb formed by bending a steel linear material. The pressure receiving plate 2Ba is formed as a surface broadened in a height direction and a seat width direction in the quadrangular frame of the back frame 2F to receive a strong body pressure from the back of the seated passenger and broadly support scapula and lumbar areas from a rear side of the back frame.

The spring wire 2Bb is formed by substantially bending a steel linear material into a U-shape along an outer peripheral shape of the pressure receiving plate 2Ba. Several regions of the spring wire 2Bb are fitted into back surface portions of the pressure receiving plate 2Ba and integrally mounted thereon. Furthermore, both upper right and left end portions 2Bb1 of the spring wire 2Bb are passed into the upper frame 2Fb of the back frame 2F from a lower side of the upper frame and attached to the upper frame slidably in the height direction. In addition, the spring wire 2Bb is bent into a stepped shape so that a central region portion of a frame piece of the spring wire extending in a seat width direction on a lower side of the spring wire obliquely projects outwardly in an upper front direction, and right and left edge region portions (attaching portions 2Bb2) obliquely project outwardly in a lower rear direction.

Furthermore, in the spring wire 2Bb, both right and left edge side attaching portions 2Bb2 which obliquely project outwardly in the lower rear direction of the lower frame piece are attached onto and supported by the lower plate 2Fc of the back frame 2F from a front side via the clips 10 made of the resin (see FIG. 1B). In consequence, the spring wire 2Bb is supported so that the central region portion obliquely projecting outwardly in the upper front direction between the right and left attaching portions 2Bb2 of the lower piece attached onto the lower plate 2Fc and the respective region pieces extending upwardly from both the outer sides of the attaching portions 2Bb2 are rotated on a hinge round the right and left attaching portions 2Bb2 in a state where the central region portion and the respective attaching portions are pushed and bent rearwardly. Here, the spring wire 2Bb is one example of "equipment" of the present invention.

According to such a constitution, the back spring 2B is always held in a state where the pressure receiving plate 2Ba is elastically pressed onto a back surface portion of an unshown pad which covers a front surface portion of the back frame 2F, by an elastic support force of the spring wire 2Bb disposed over a space between the upper frame 2Fb and the lower plate 2Fc of the back frame 2F. Furthermore, as to the back spring 2B, when a back rest load of the seated passenger is applied to the seat back 2, a rearwardly pressing force is applied to the pressure receiving plate 2Ba, and hence the back spring 2B elastically and softly receives this load while pushing and bending the spring wire 2Bb rearwardly as described above.

Figure 5:
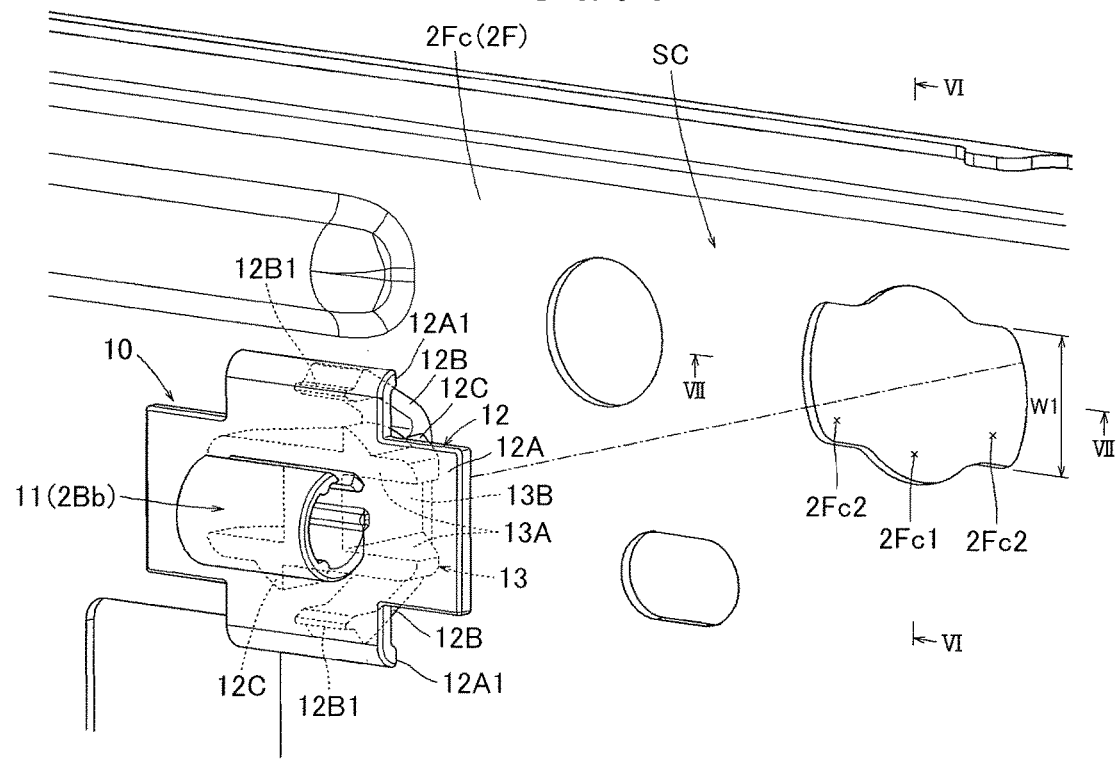
FIG. 5 is an enlarged view of a part V of FIG. 2.

Additionally, as shown in FIG. 5, the clips 10 are inserted from the front side into attaching holes 2Fc1 formed in the lower plate 2Fc to extend through the lower plate, whereby the clips are fitted and attached so that the clips are prevented from coming off from the attaching holes 2Fc1 and radial movements of the clips in the attaching holes 2Fc1 are restricted. However, even when the clips 10 are attached into the attaching holes 2Fc1, the clips are rotatable in a rotating direction around an axially inserting direction in the attaching holes 2Fc1, respectively (see FIG. 10 and FIG. 11). The clips are rotatable in this manner, and hence, as shown in FIG. 4, even when the clips 10 are disadvantageously formed so that the attaching portions 2Bb2 of the spring wire 2Bb shift from each other in the height direction, the shift can be reduced by rotating the clips to tilt the spring wire 2Bb while sliding attaching positions of the clips to the attaching portions 2Bb2 in the seat width direction, respectively.

Figure 11:
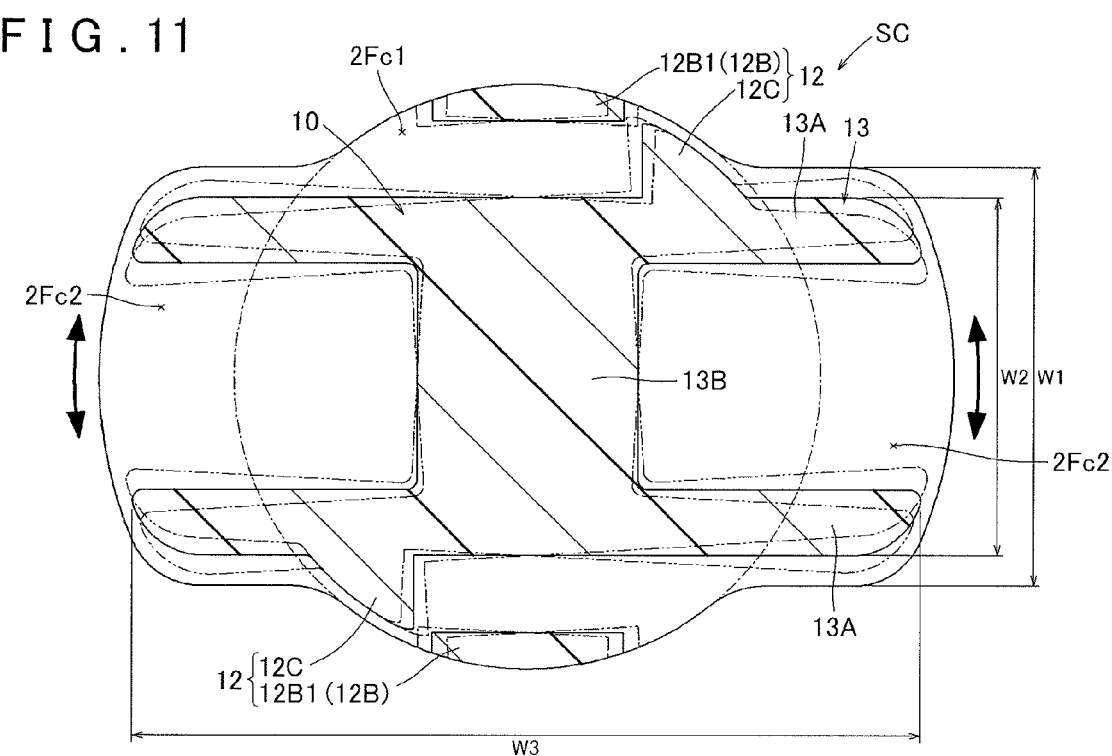
FIG. 11 is a sectional view showing a structure where the clip is rotatable to the attaching hole.
Figure 12:
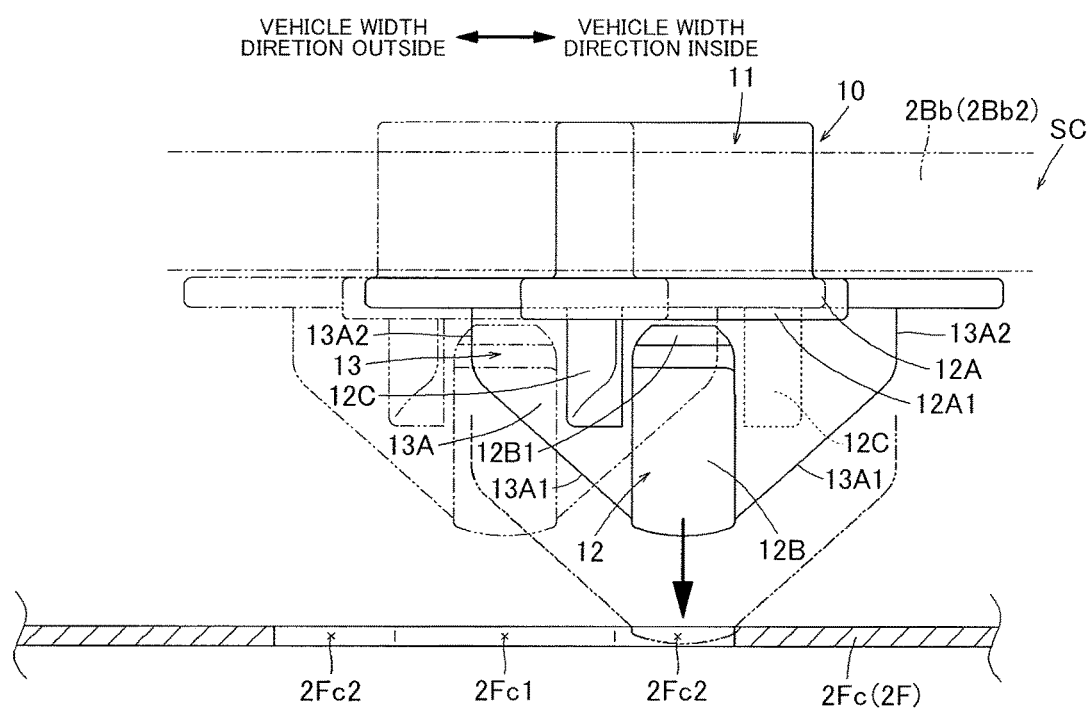
FIG. 12 is a sectional view showing that the clip of FIG. 7 is inserted into a position which shifts to the attaching hole.

Furthermore, as shown in FIG. 12, even when each of the clips 10 is inserted into the attaching hole 2Fc1 from a position which shifts (deviates) from the attaching hole 2Fc1 in the seat width direction, the clip is inserted into a normal position in the attaching hole 2Fc1 while correcting the positional shift by an after-mentioned guide structure. Hereinafter, the attaching structure in which each of the clips 10 is inserted into the attaching hole 2Fc1 to attach the clip to the seat frame will specifically be described in detail with reference to FIG. 5 to FIG. 12. It is to be noted that the structures in which the clips 10 are inserted into the attaching holes 2Fc1 to attach the clips to the seat frame are identical. Therefore, hereinafter, the attaching structure on one side shown in FIG. 5 (the right side when facing the drawing: an inner side in a vehicle width direction) will representatively be described.

Figure 6:
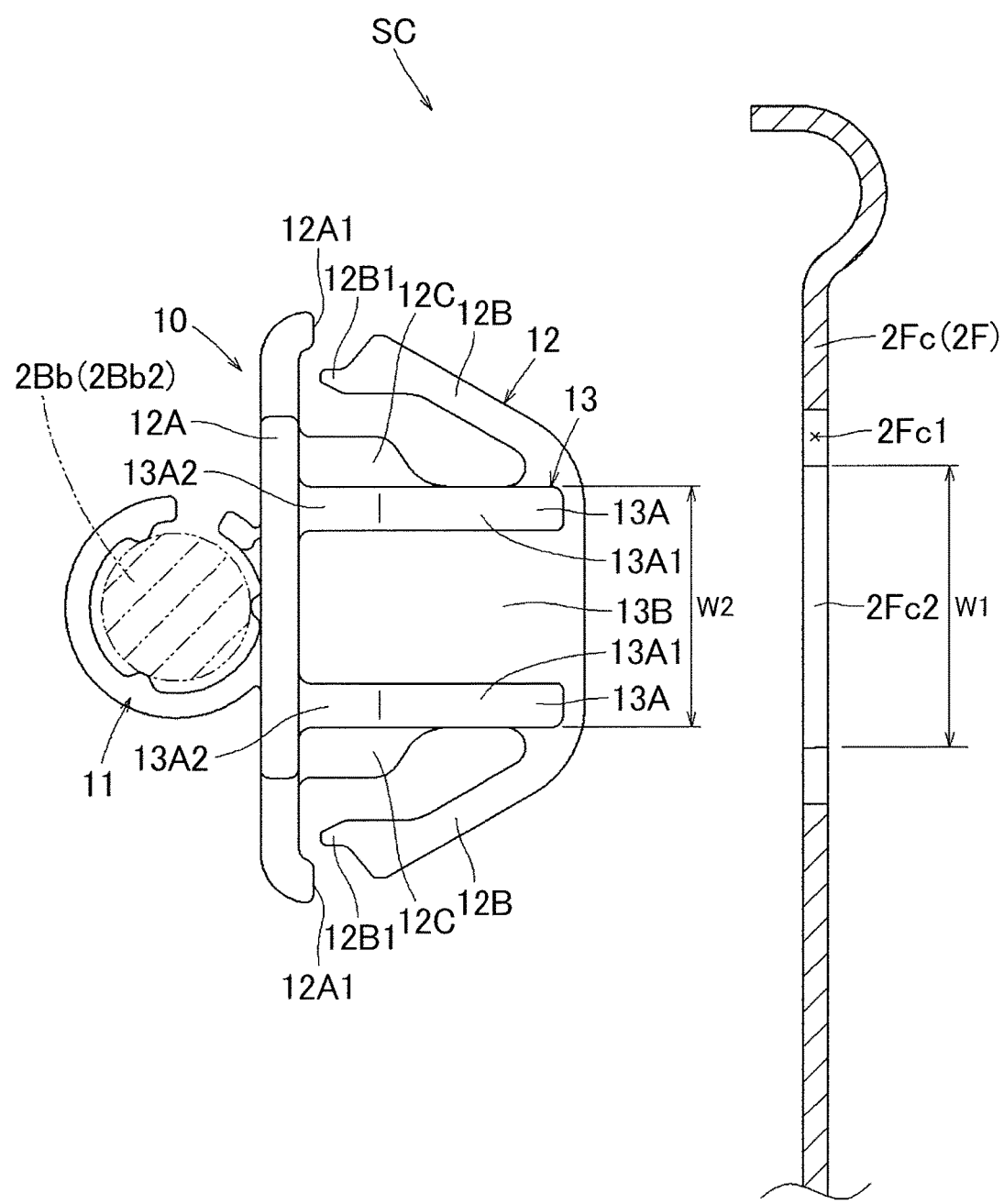
FIG. 6 is a sectional view taken along the VI-VI line of FIG. 5 (including an arrow view of a clip)

First, a constitution of the clip 10 will be described. As shown in FIG. 5 to FIG. 7, the clip 10 is constituted of one component formed by injection of a resin. The clip 10 is integrally constituted of a wire mounting portion 11 into which the attaching portion 2Bb2 of the spring wire 2Bb is fitted so that the wire is mounted therein, a fitting portion 12 which is inserted into the attaching hole 2Fc1 and attached to the back frame, and a standing plate-shaped extending portion 13 extending outwardly from the fitting portion 12 on both sides in the seat width direction.

The wire mounting portion 11 is formed in a region portion on a side opposite to the inserting direction of the clip 10. The wire mounting portion 11 is curved in the form of a hook into which the attaching portion 2Bb2 of the spring wire 2Bb can be pushed from an upside to mount the wire. The fitting portion 12 is formed in a region portion on a tip side in the inserting direction of the clip 10. The fitting portion 12 has a seat plate 12A, a pair of elastic engaging pieces 12B, and a pair of fitting projections 12C. The elastic engaging pieces 12B bend backwardly in mutually opposite radial directions from tip portions of two plate pieces 13A of the after-mentioned extending portion 13 which extends in the form of the standing plate from the surface of the seat plate 12A in the inserting direction, to extend toward the seat plate 12A. Each of the fitting projections 12C is projected from a root (a joining portion between the extending portion 13 and the seat plate 12A) on an outer surface of the plate piece 13A of the extending portion 13. Here, each of the elastic engaging pieces 12B is one example of "an elastic engaging region" of the present invention, and each of the fitting projections 12C is one example of "a fitting region" of the present invention.

Figure 9:
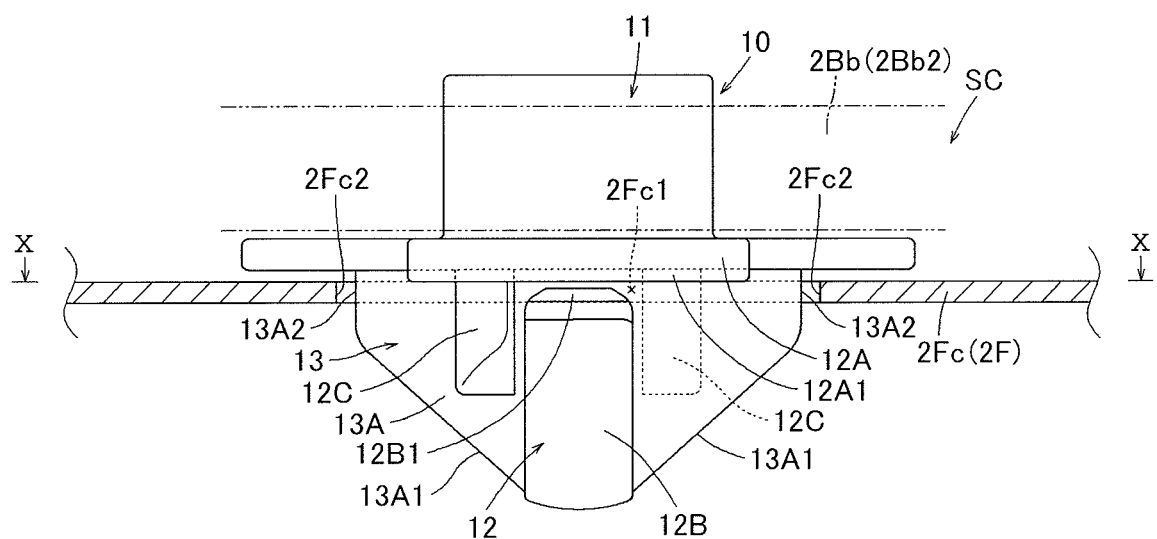
FIG. 9 is a sectional view showing that the clip of FIG. 7 is attached to the attaching hole (including an arrow view of the clip)

The seat plate 12A is formed into a rectangular shape which is long in the seat width direction, and the wire mounting portion 11 is formed on the surface of the seat plate on the side opposite to the inserting direction. As shown in FIG. 8 and FIG. 9, the seat plate 12A is shaped in the form of a plate which is larger than the attaching hole 2Fc1, and when the fitting portion 12 is inserted into the attaching hole 2Fc1, the fitting portion fits in the surface of the lower plate 2Fc to regulate movement of the fitting portion 12 in the inserting direction. In outer peripheral edge portions of the surface of the seat plate 12A in the inserting direction, there are formed projecting portions 12A1 each of which projects in the form of a streak toward the inserting direction. The projecting portions 12A1 disposed in the outer peripheral edge portions of the seat plate 12A only abut on the surface of the lower plate 2Fc, and when a force in the inserting direction is further applied to the abutted clip 10, an inner region portion is elastically deformed in a bent state in the inserting direction by use of the projecting portions 12A1 as supporting points.

As shown in FIG. 5 to FIG. 7, the respective elastic engaging pieces 12B are curved on the side opposite to the inserting direction to extend outwardly from the tip portions of the plate pieces 13A of the standing plate-like extending portion 13 in the mutually opposite radial directions. The elastic engaging pieces 12B are projected outwardly so that a distance between outer peripheral surfaces of the engaging pieces on a root side (ends in the inserting direction) is smaller than a hole diameter of the attaching hole 2Fc1, and a distance between outer peripheral surfaces on the tip side (the side opposite to the root side) is larger than the hole diameter of the attaching hole 2Fc1. Furthermore, in projected end portions of the elastic engaging pieces 12B, engaging pawls 12B1 each having a dent on an outer peripheral edge side are formed.

When the respective elastic engaging pieces 12B having the above constitution are inserted into the attaching hole 2Fc1, the outer peripheral surfaces of the engaging pieces abut on an inner peripheral surface of the attaching hole 2Fc1 to be inserted into the attaching hole 2Fc1 while mutually elastically pushing and narrowing projected shapes of the engaging pieces. At this time, the elastic engaging pieces 12B are inserted into the attaching hole 2Fc1 while exerting the same repulsive force at symmetric positions of the attaching hole 2Fc1. In consequence, when the elastic engaging pieces 12B are inserted into the attaching hole 2Fc1, positions of the engaging pieces do not shift in an arranging direction (the height direction), but the engaging pieces are straightly inserted into the attaching hole 2Fc1. Furthermore, when the dents of the engaging pawls 12B1 on the tip sides of the elastic engaging pieces 12B are inserted into the attaching hole 2Fc1 to reach back edge portions of the attaching hole 2Fc1, the engaging pieces are restored outwardly in the radial direction to engage with the back edge portions of the attaching hole 2Fc1 so that the dents of the engaging pawls 12B1 are fitted into the back edge portions of the attaching hole 2Fc1 (see FIG. 8 to FIG. 10).

By the above engagement, the respective elastic engaging pieces 12B are hooked on peripheral edge portions of the attaching hole 2Fc1 from a backside, so that a come-off preventive force and the radial repulsive force are exerted on the peripheral edge portions of the attaching hole 2Fc1.

Figure 10:
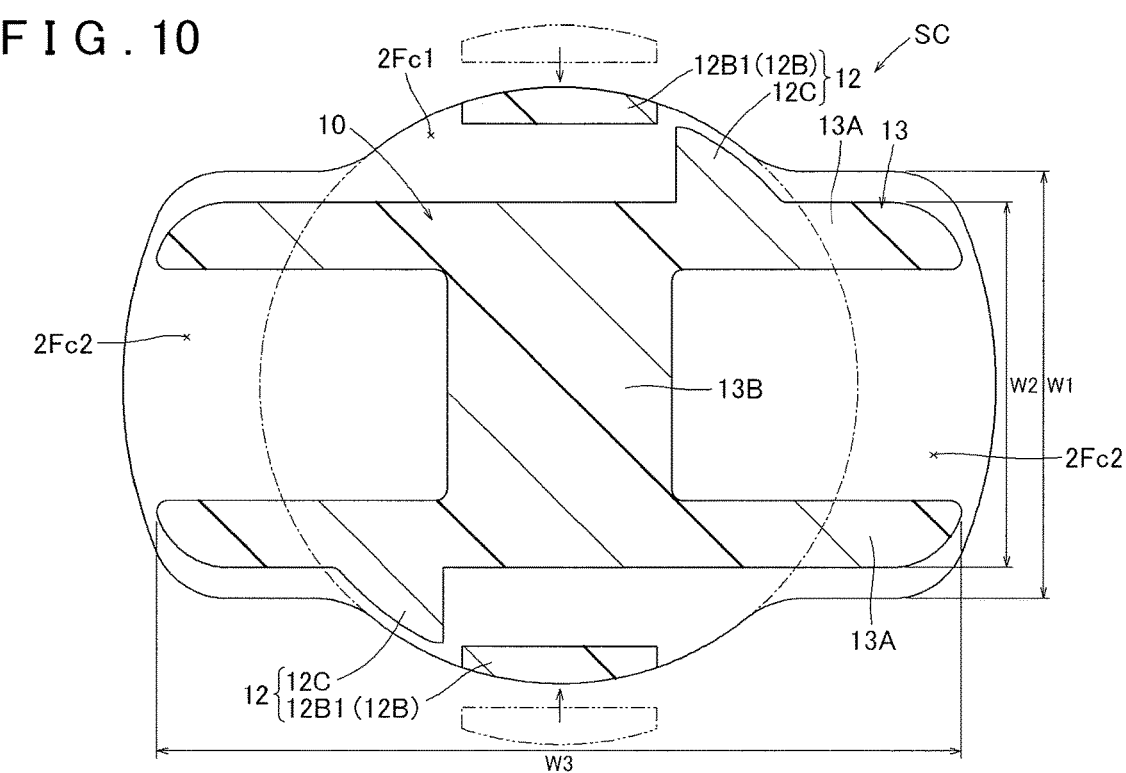
FIG. 10 is a sectional view taken along the X-X line of FIG. 9.

Furthermore, the clip 10 is inserted into the attaching hole 2Fc1 until the elastic engaging pieces 12B are hooked on the peripheral edge portions of the attaching hole 2Fc1, so that the seat plate 12A (the projecting portions 12A1) abuts on the surface of the lower plate 2Fc to be inhibited from moving to the lower plate 2Fc in both the inserting direction and a pulling direction (see FIG. 8 to FIG. 10).

As shown in FIG. 5 to FIG. 7, each of the fitting projections 12C is projected in the form of a pillar having a fan-shaped cross section at a position above the joining portion between each of the plate pieces 13A constituting the extending portion 13 and the seat plate 12A. As shown in FIG. 10, respective fan-shaped outer peripheral surfaces of the fitting projections 12C have circular arc shapes having an equal radius and are equally disposed at two portions facing each other in a circumferential direction to match a hole shape of the attaching hole 2Fc1.

As shown in FIG. 5 to FIG. 7, the respective fitting projections 12C are inserted into the attaching hole 2Fc1 while being centered, when the elastic engaging pieces 12B of the clip 10 are inserted into the attaching hole 2Fc1 so that the elastic engaging pieces 12B abut on the inner peripheral surface of the attaching hole 2Fc1 to be equally pushed and narrowed. Therefore, the fitting projections 12C are guided to such positions as to be suitably fittable in the attaching hole 2Fc1 by a simple operation of inserting the clip 10 into the attaching hole 2Fc1 as described above. Furthermore, when the seat plate 12A abuts on the surface of the lower plate 2Fc, the fitting projections are suitably fitted into the attaching hole 2Fc1, so that radial movement of the clip 10 in the attaching hole 2Fc1 is substantially prevented (restricted) (see FIG. 8 and FIG. 10). In the strict sense, the fitting projections 12C fit into the attaching hole 2Fc1 via a slight space in the radial direction so that a manufacturing error can be reduced.

As shown in FIG. 5 to FIG. 7, the extending portion 13 is integrally constituted of the two plate pieces 13A each extending in the form of the standing plate from the surface of the seat plate 12A in the inserting direction, and a connecting piece 13B (see FIG. 10) integrally connecting these plate pieces to each other at a central position in the seat width direction. The two plate pieces 13A are plates which face each other in parallel with each other and which are long in the seat width direction. Furthermore, when the fitting portion 12 of the clip 10 is inserted into the attaching hole 2Fc1, the plate pieces are inserted into the attaching hole 2Fc1 and an expanded hole 2Fc2, respectively (see FIG. 8 to FIG. 10). The expanded hole 2Fc2 expands a hole shape thereof on both sides of the attaching hole 2Fc1 in the seat width direction.

Here, as shown in FIG. 10, an outer peripheral surface of the expanded hole 2Fc2 forms a circular shape of a concentric circle which is one size larger than a round shape of the attaching hole 2Fc1. The expanded hole 2Fc2 is formed so that a hole width W1 of the concentric circle in the height direction is larger than a width W2 between the plate pieces 13A of the extending portion 13 inserted into the expanded hole. Consequently, as to the expanded hole 2Fc2, when the fitting portion 12 of the clip 10 is inserted into the attaching hole 2Fc1 to insert the extending portion 13 into the expanded hole 2Fc2, the fitting portion 12 can be oscillated in the rotating direction in the attaching hole 2Fc1 as shown in FIG. 11. By this oscillating movement, as described above with reference to FIG. 4, the clips 10 can be rotated to reduce the shift, when the attaching portions 2Bb2 of the spring wire 2Bb are disadvantageously formed to shift from each other in the height direction.

The two plate pieces 13A have the same shape. Therefore, hereinafter, one of the plate pieces 13A will be described. As shown in FIG. 9 and FIG. 10, the plate piece 13A of the extending portion 13 is formed so that a plate width W3 has such a dimension that the extending portion fits in a space between circularly curved inner peripheral surfaces of the expanded hole 2Fc2 via a slight space in the seat width direction (to reduce the manufacturing error). Both side surfaces of the plate piece 13A of the extending portion 13 in the seat width direction are formed as vertical surfaces 13A2 extending straightly in the inserting direction. Additionally, as shown in FIG. 5 to FIG. 7, a tip of the plate piece 13A of the extending portion 13 extends outwardly in the inserting direction beyond a region where the engaging pawl 12B1 on the tip side of each of the elastic engaging pieces 12B of the fitting portion 12 and each of the fitting projections 12C are positioned.

Tip surfaces of the plate piece 13A of the extending portion 13 in the inserting direction are formed as conically inclined surfaces 13A1. The inclined surfaces 13A1 are formed to extend like slopes of a mountain toward both sides in the seat width direction from a top of the mountain, i.e., a tip portion of a center of the plate piece 13A of the extending portion 13 in the seat width direction from which each of the elastic engaging pieces 12B extends outwardly. According to the inclined surfaces 13A1, as shown in FIG. 12, even when an inserting position of the fitting portion 12 of the clip 10 into the attaching hole 2Fc1 shifts from the attaching hole 2Fc1 to any side in the seat width direction, the fitting portion 12 is guided by one of the inclined surfaces 13A1 so that the fitting portion 12 can be centered and inserted into the attaching hole toward the center of the attaching hole 2Fc1 in the seat width direction. Here, each of the inclined surfaces 13A1 is one example of "a guide surface" of the present invention.

Specifically, as shown in FIG. 7, the inclined surfaces 13A1 are formed to extend like the slopes from the tip portion of the center of the plate piece 13A of the extending portion 13 in the seat width direction from which each of the elastic engaging pieces 12B extends outwardly, and therefore, the clip 10 has the top of the mountain on the surface on the most tip side in the inserting direction, from which the slopes of the mountain are formed on both the sides in the seat width direction. According to such a constitution of the inclined surfaces 13A1, as shown in FIG. 12, even when the fitting portion 12 (the elastic engaging pieces 12B) of the clip 10 is inserted into the position which shifts from the attaching hole 2Fc1 to one of the sides of the attaching hole in the seat width direction, one of the inclined surfaces 13A1, prior to the fitting portion 12 (the elastic engaging pieces 12B), abuts on the outer peripheral surface of the expanded hole 2Fc2 on the shifted side, so that the fitting portion 12 can be guided to the center of the attaching hole 2Fc1 in the seat width direction.

Therefore, even when the fitting portion 12 of the clip 10 is inserted into the attaching hole 2Fc1 from the position which noticeably shifts from the attaching hole in the seat width direction, the fitting portion 12 of the clip 10 can suitably be fitted into the position of the attaching hole 2Fc1 only by an operation of simply applying a force in the inserting direction, due to a guide structure by the inclined surfaces 13A1 in the seat width direction and a guide structure by the elastic engaging pieces 12B in the radial direction.

That is, the elastic engaging pieces 12B of the clip 10 are tapered toward the tip side in the inserting direction. Therefore, even when the inserting position of each of the elastic engaging pieces 12B into the attaching hole 2Fc1 shifts to a certain degree in the radial direction, the elastic engaging piece 12B can be inserted into the attaching hole 2Fc1 while correcting the positional shift in the radial direction (while being centered) by an inclined outer peripheral surface shape of the engaging piece, as long as the tapered outer peripheral surface of the engaging piece abuts on any position of the inner peripheral surface of the attaching hole 2Fc1.

Additionally, as shown in FIG. 12, even when each of the elastic engaging pieces 12B of the clip 10 is inserted into the position which deviates from the attaching hole 2Fc1 to any side in the seat width direction, one of the inclined surfaces 13A1 of the extending portion 13, prior to the elastic engaging pieces 12B, abuts on the outer peripheral surface of the expanded hole 2Fc2 on the shifted side, so that the elastic engaging pieces 12B can be inserted toward the center of the attaching hole 2Fc1 while being centered toward the center of the attaching hole 2Fc1 in the seat width direction.

Even when each of the elastic engaging pieces 12B of the clip 10 is inserted from the position which noticeably shifts from the hole shape of the attaching hole 2Fc1, the elastic engaging piece can be guided by the inclined surfaces 13A1 of the extending portion 13, so that the large positional shift can be corrected. In addition, from a middle state where the elastic engaging pieces 12B are inserted into the attaching hole 2Fc1 (the middle state where the positional shift is made smaller to a certain degree), the engaging pieces can be centered until the fitting portion 12 of the clip 10 is suitably fitted into the attaching hole 2Fc1, by a position correcting function of allowing the elastic engaging pieces 12B to abut on the inner peripheral surface of the attaching hole 2Fc1, even when the plate width W3 of the plate piece 13A of the extending portion 13 is smaller than an inner diameter of the outer peripheral surface of the expanded hole 2Fc2.

In summary, the clip attaching structure SC of the present embodiment mentioned above has the following constitution. The seat frame (the lower plate 2Fc) includes the attaching hole 2Fc1 formed to extend through the frame. The clip 10 includes the fitting portion 12 which is inserted into the attaching hole 2Fc1 to fit in the inner peripheral portion of the attaching hole 2Fc1. Furthermore, the seat frame (the lower plate 2Fc) includes the expanded hole 2Fc2 which expands the hole shape of the attaching hole 2Fc1 in a specific radial direction (the seat width direction). Additionally, the clip 10 includes the extending portion 13 which extends the shape thereof from the fitting portion 12 in the specific radial direction (the seat width direction) to be inserted into the expanded hole 2Fc2.

The tip of the extending portion 13 extends beyond the fitting portion 12 in the inserting direction to be also inserted into the attaching hole 2Fc1, and on the tip surface of the extending portion in the inserting direction, the guide surface (the inclined surfaces 13A1) is formed to abut on the peripheral edge portion of the expanded hole 2Fc2, when the inserting position of the fitting portion 12 shifts from the attaching hole 2Fc1 in the specific radial direction (the seat width direction), thereby centering the fitting portion 12 to the attaching hole 2Fc1. According to such a constitution, even when the fitting portion 12 of the clip 10 is inserted from the position which shifts from the attaching hole 2Fc1 in the specific radial direction (the seat width direction), the shift of the inserting position of the clip 10 can be corrected by the guide surface (the inclined surfaces 13A1) of the extending portion 13.

In addition, the fitting portion 12 has the constitution where there are equally disposed, in the circumferential direction, the fitting regions (the fitting projections 12C) which are inserted into the attaching hole 2Fc1 to fit in the inner peripheral portions of the attaching hole 2Fc1, and elastic engaging regions (the elastic engaging pieces 12B) which are inserted into the attaching hole 2Fc1 prior to the fitting regions (the fitting projections 12C) to be elastically pushed and narrowed, and then restored to be hooked on the peripheral edge portions of the attaching hole 2Fc1 from the backside, thereby exerting the come-off preventive force and the radial repulsive force.

According to such a constitution, the fitting portion 12 of the clip 10 is centered and inserted into the attaching hole 2Fc1 by bending the elastic engaging regions (the elastic engaging pieces 12B) equally disposed in the circumferential direction of the fitting portion. Furthermore, at the centered position, the fitting portion 12 fits in the attaching hole 2Fc1 in a state where the radial movement of the fitting portion in the attaching hole is restricted, when the fitting regions (the fitting projections 12C) equally disposed in the circumferential direction are similarly fitted into the inner peripheral portions of the attaching hole 2Fc1. In consequence, the fitting portion 12 can elastically be centered and inserted into the attaching hole 2Fc1, but the fitting portion 12 can finally be fitted into the attaching hole 2Fc1 so that the radial movement of the fitting portion in the attaching hole is restricted.

In addition, the extending portion 13 is formed to extend outwardly on both the outer sides of the fitting portion 12. The fitting portion 12 exerts a fitting force in the attaching hole 2Fc1 in both radial directions (the seat height direction) perpendicular to a projecting direction of the extending portion 13. According to this constitution, the extending portion 13 can correct the shift of the inserting position of the fitting portion 12 over a broader range. In addition, when the fitting portion 12 is inserted into the attaching hole 2Fc1, the extending portion 13 and the fitting portion 12 can be inserted in a state where the fitting portion 12 can be guided so that the position of the fitting portion does not shift on any side in an in-plane direction of the attaching hole 2Fc1 (an in-plane direction such as the seat width direction or the seat height direction of the lower panel).

In addition, the attaching hole 2Fc1 is formed into a precisely round shape. The fitting portion 12 of the clip 10 is attached so that the positional shift to the attaching hole 2Fc1 in the rotating direction can be reduced. According to such a constitution, the shift of the attaching position of the equipment (the spring wire 2Bb) can be reduced by regulating movement in which tilting by rotation is less performed.

The one embodiment of the present invention has been described above, but the present invention can be carried out in various configurations in addition to the above embodiment. For example, "the vehicle seat" as an object of the present invention can be applied to a seat other than the driver's seat of the automobile, and can broadly be applied to a seat for use in another vehicle such as a railway, an aircraft, a submarine or a ship.

In addition, there is not any special restriction on "the clips" as long as the clips function as the attachments to attach the equipment to the seat frame, and as a type of equipment as an attaching object and a specific region of the seat frame to which each clip is attached, various combinations can be employed. Specifically, the equipment may be another seat equipment such as a wire harness or an electric component. Additionally, as the seat frame, various seat constituting frames such as a seat cushion, a head rest and a slide rail can be employed in addition to the frame constituting the seat back. In addition, "the clips" may be made of a material other than the resin, e.g., a rubber or a metal.

Additionally, the attaching hole to which the clip is attached is not necessarily limited to the round hole. The hole may have a quadrangular shape or an elongated shape, as long as the clip is inserted into the hole to attach the clip to the frame. In addition, the expanded hole may similarly have any shape to expand the hole shape from the attaching hole in the specific radial direction. In addition, the expanded hole may expand the hole shape from the attaching hole only in one specific radial direction. "The specific radial direction" in which the expanded hole expands the hole shape from the attaching hole may be set to any radial direction in accordance with a use purpose.

In addition, the guide surface formed on the tip surface of the extending portion in the inserting direction may be a curved inclined surface in addition to the straight inclined surface. The guide surfaces are formed on both sides in the width direction, but the guide surface may only be formed on one side. Additionally, one plate peace may be disposed. In addition, in the fitting portion of the clip, there may be disposed, in the circumferential direction, three or more fitting regions which are inserted into the attaching hole to fit in the inner peripheral portions of the attaching hole, and three or more elastic engaging regions which are inserted into the attaching hole prior to the fitting regions to elastically engage with the peripheral edge portions of the attaching hole.

What is claimed is:

1. A clip attaching structure comprising:
    a seat frame including an attaching hole extending through the seat frame and an expanded hole that expands a hole shape of the seat frame from the attaching hole in a radial direction; and
    a clip attached to the seat frame, the clip including:
        a fitting portion configured to be inserted into the attaching hole to fit in an inner peripheral portion of the attaching hole; and
        an extending portion that extends outwardly in the radial direction from outer sides of the fitting portion and that is configured to be inserted into the expanded hole, wherein
        a tip of the extending portion extends beyond the fitting portion in an inserting direction and is also configured to be inserted into the attaching hole, and on a tip surface of the extending portion in the inserting direction a guide surface is provided such that when the fitting portion is being inserted into the attaching hole in the radial direction, the guide surface abuts on a peripheral edge portion of the expanded hole to guide the fitting portion toward the attaching hole such that the fitting portion is centered, and
    when the fitting portion is inserted in the attaching hole, the fitting portion exerts a fitting force on the attaching hole, at at least two opposing positions of the attaching hole, in a direction perpendicular to the radial direction that the extending portion extends outwardly in.

2. The clip attaching structure according to claim 1, wherein
    the fitting portion includes:
        fitting regions that are equally disposed about the clip in a circumferential direction, the fitting regions are configured to be inserted into the attaching hole to fit in the inner peripheral portion of the attaching hole, and
        elastic engaging regions which are configured to be inserted into the attaching hole prior to the fitting regions and elastically pushed, narrowed, and restored to hooked positions on peripheral edge portions of the attaching hole from a backside of the seat frame, and
        the elastic engaging regions exert the fitting force, which is a radial repulsive force, and a come-off preventive force.

3. The clip attaching structure according to claim 2, wherein
    a distance between outer peripheral surfaces of ends of the elastic engaging regions in the inserting direction is smaller than a hole diameter of the attaching hole, and
    a distance between outer peripheral surfaces of opposite ends of the elastic engaging regions is larger than the hole diameter of the attaching hole.

4. The clip attaching structure according to claim 1, wherein the attaching hole defines a round shape, and the fitting portion of the clip is attached such that a positional shift is reduced in a rotating direction of the attaching hole.

* * * * *